United States Patent [19]

Chambers et al.

[11] Patent Number: 4,944,370
[45] Date of Patent: Jul. 31, 1990

[54] DRUM DRIVE FOR USE WITH MULTIPLE DISC BRAKES

[75] Inventors: Warren D. Chambers; Jeffrey T. Jurczak, both of South Bend, Ind.

[73] Assignee: Allied-Signal Inc., Morristown, N.J.

[21] Appl. No.: 329,211

[22] Filed: Mar. 27, 1989

[51] Int. Cl.$^5$ .............................................. F16D 55/36
[52] U.S. Cl. ................................. 188/71.5; 188/71.6; 188/264 G; 301/6 WB
[58] Field of Search .................... 188/71.5, 71.6, 71.3, 188/73.2, 71.4, 264 G, 264 A, 264 AA, 264 W, 264 R; 301/6 R, 6 WB, 6 E, 6 A

[56] References Cited

U.S. PATENT DOCUMENTS

| | | | |
|---|---|---|---|
| 1,727,486 | 9/1929 | Sauzedde | 188/218 R |
| 1,791,685 | 2/1931 | Rockwell et al. | 188/71.5 |
| 1,859,280 | 5/1932 | Corbin, Jr. | 188/71.5 |
| 2,124,469 | 7/1938 | Peterman | 301/6 R |
| 2,304,774 | 12/1942 | Ash | 188/71.5 |
| 2,771,966 | 11/1956 | Davey | 188/71.6 |
| 2,881,875 | 4/1959 | Felts | 188/218 R |
| 2,889,173 | 6/1959 | Miller | 301/6 R |
| 2,998,870 | 9/1961 | Herman et al. | 188/264 R |
| 3,136,389 | 6/1964 | Cummins | 301/71.5 |
| 3,357,521 | 12/1967 | Lallemant | 188/72.1 |
| 3,480,115 | 11/1969 | Lallemant | 188/72.1 |
| 3,482,654 | 12/1969 | Abu-Akeel | 188/72.1 |
| 3,829,162 | 8/1974 | Stimson et al. | 301/6 A |
| 3,836,201 | 9/1974 | Stimson et al. | 301/6 E |
| 3,951,240 | 4/1976 | Dowell et al. | 188/71.5 |
| 3,958,833 | 5/1976 | Stanton | 188/71.5 X |
| 3,983,974 | 10/1976 | Dowell et al. | 188/71.6 X |
| 4,000,791 | 1/1977 | Kovac | 188/71.5 |
| 4,084,857 | 4/1978 | Vander Veen | 301/6 WB |
| 4,130,187 | 12/1978 | Midolo | 188/264 CC |
| 4,286,694 | 9/1981 | Wiseman, Jr. et al. | 188/71.5 |
| 4,290,505 | 9/1981 | Kramer | 188/18 A |

FOREIGN PATENT DOCUMENTS 155830 3/1954 Australia .
1141929 9/1957 France .................. 301/6 E Primary Examiner—Andres Kashnikow
Assistant Examiner—Matthew C. Graham
Attorney, Agent, or Firm—Larry J. Palguta; Ken C. Decker

[57] ABSTRACT

The drum drive (100, 200) comprises a generally annular-shaped drum (100, 200) which extends axially within an axial opening in an inboard half (140, 240) of a wheel (130, 230). The drum drive (100, 200) has end openings (112, 114; 212, 214) at opposite ends (102, 104; 202, 204) thereof which provide access to an interior axially extending opening (122, 222) of the drum drive (100, 200). An outboard end (104, 204) of the drum drive (100, 200) includes a radially extending flange (108, 208) which defines the associated end opening (114, 214) and provides a plurality of openings (118, 218) for receiving tie bolts (150, 250) that connect the drum drive (100, 200) with the wheel (130, 230). The drum drive (100, 200) includes a plurality of circumferentially spaced-apart, axially extending splines (128, 228) which extend radially inwardly from the interior surface of the drum drive (100, 200) and into the interior axially extending opening (122, 222). The splines (128, 228) are received within complementary-shaped openings (178, 278) of associated rotors (170, 270) in order to couple the rotors (170, 270) with the drum drive (100, 200) and wheel (130, 230).

9 Claims, 6 Drawing Sheets

DRUM DRIVE FOR USE WITH MULTIPLE DISC BRAKES

The present invention relates generally to a mechanism for attaching the rotor discs of multiple disc brakes with a rotating wheel, and in particular a mechanism for attaching rotor discs to aircraft wheels.

Because of recent demands for larger diameter aircraft wheels which have an increased width between wheel flanges for radial tires and greater radial load requirements, the amount of aircraft wheel distortion or ovalization has also increased. As a result, wheel ovalization with current wheel drive key systems, such as illustrated in Stanton U.S. Pat. No. 3,958,833, can impart concentrated radial loads to rotor discs which may damage the rotor discs. This may be particularly true when the rotor discs are made of carbon materials. Wheel drive key systems, such as those illustrated in Stanton U.S. Pat. No. 3,958,833, operate by engaging the outside diameter of the rotor discs in order to transmit structural loads through the outside diameter. Wheel keys are mounted to the wheel at both the tie bolt and inboard flange regions (see FIG. 1 herein). Because the inboard flange region is where the greatest wheel deflection or distortion occurs, wheel keys move radially as the wheel deflects radially inwardly and outwardly through a complete revolution. Due to the localized wheel ovalization, radial loads are then transmitted to the inserts about the circumference of the rotor discs. Damage to the rotors and rotor drive mechanisms can occur as a result of wheel ovalization and this leads to a decrease in brake life. The decrease in brake life can further lead to a premature replacement of the stator and rotor discs and higher cost per brake landing costs.

It is highly desirable to simplify the rotor drive system in order to attain several important objectives. First, current wheel drive key systems require several pieces of hardware which include drive keys, inserts, rivets, and so on necessary for installation. A rotor drive key system in present use for an aircraft wheel and brake assembly can require as many as 270 parts. It would be tremendously advantageous to provide a rotor drive system which comprises a single piece of hardware, the one piece of hardware substantially reducing the parts and assembly costs. Another important objective is to increase the overall useful life of the brake. As illustrated in FIGS. 2 and 3 herein, wheel key systems can reduce brake life if the drive insert rivets touch one another after the brake has experienced substantial wear of the discs. Contact between the rivets may lead to premature replacement of the brake. By eliminating the drive inserts disposed about the circumference of the discs (the drive inserts being held in place by the rivets), the brake discs may be allowed to wear even further and therefore increase the useful life of the brake while decreasing the costs per brake landing. Another important objective is to simplify the brake disc refurbishment process. A refurbishment process for the brake discs can extend the life of the individual discs beyond their previous throw-away condition when they are worn. Current rotor drive systems require the disassembly of rotor hardware before refurbishment, and reassembly following refurbishment. A rotor drive system which eliminates the multiplicity of hardware would significantly reduce refurbishment time and cost. Another important objective is to reduce the conduction of heat directly to the wheel. The increased use of carbon discs in aircraft brakes has placed stringent temperature requirements on the surrounding wheel and brake structure. Therefore, it is desirable to provide a rotor drive system which reduces the conduction of heat directly to the wheel.

The present invention meets the above objectives by providing a drum drive for a wheel which surrounds a multiple disc brake, the drum drive having an axial length extending axially within an axial opening of said wheel such that the axial length is disposed substantially within the axial opening, the drum drive further comprising a substantially annular drum having end openings at opposite axial ends thereof communicating with an axially extending interior opening, one end opening defined by an attachment which includes a plurality of means for attachment which receive connection means connecting the drum with the wheel, a plurality of circumferentially spaced-apart, axially extending drive means extending radially inwardly into the interior opening of said drum, the drive means engaging associated reception means of associated discs in order to couple the associated discs with the drum and wheel, and a substantial portion of the axial length of the drum spaced substantially radially inwardly from the wheel so that radial spacing between the drum and wheel minimizes wheel deflection radial loading upon discs of said brake.

One way of carrying out the invention is described in detail below with reference to the drawings which illustrate an embodiment in which.

Figure 1:
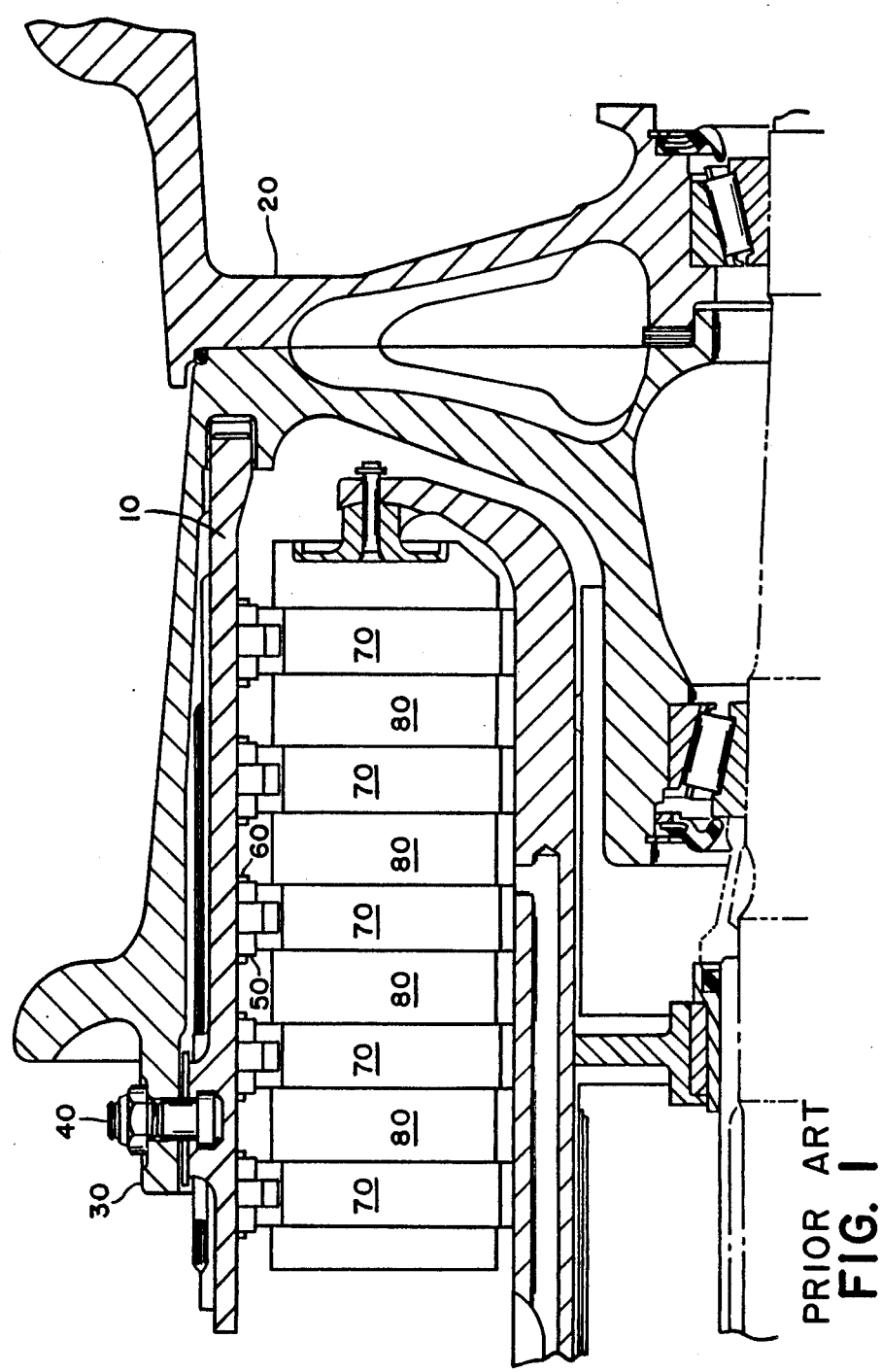
FIG. 1 is a section view of a prior art wheel drive key system.
Figure 2:
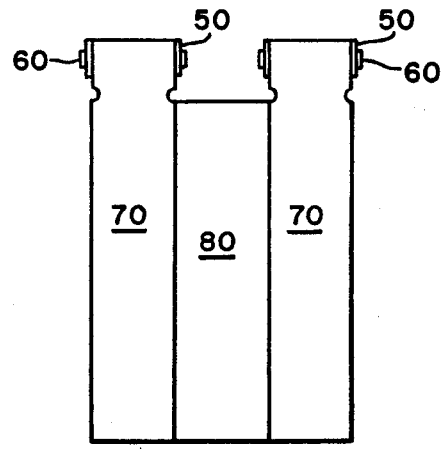
FIG. 2 is a schematic illustration of a stator and a pair of rotors which have rotor drive inserts and rivets thereabout.
Figure 3:
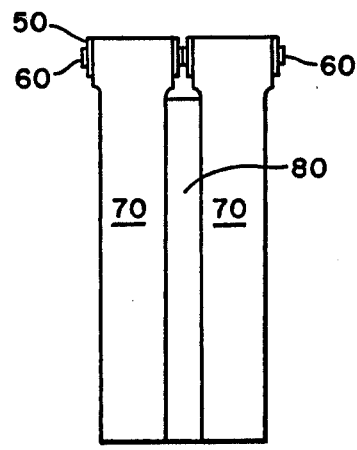
FIG. 3 is a schematic illustration of the stator and rotors of FIG. 2 after they have experienced wear.

FIGS. 1–3 illustrate a prior art wheel having a multiple disc brake wherein the rotor discs have rotor inserts disposed about the periphery thereof. FIG. 1 illustrates what is known as a beam wheel key and rotor insert assembly. Individual wheel keys 10 are each coupled to the wheel at the tie bolt region 20 and inboard flange region 30. The inboard flange region 30 includes a plurality of openings for the key bolts 40. FIG. 2 illustrates the interleaved discs wherein the rotor discs 70 have rotor drive inserts 50 which are attached by means of rivets 60 to the periphery of the rotors. A rotor drive system of this type can require a total of 270 separate pieces for one brake assembly. Additionally, the holes in the inboard flange region 30 which receive the key bolts 40 may be in a highly stressed region of the wheel. Such wheel flange stresses can become even greater with the use of a radial tire. Wheel flange deflection or ovalization results as an aircraft wheel rotates over a complete revolution. Wheel key deflection also occurs because of its attachment in the wheel flange region 30. Wheel key deflections can also be greater than wheel flange deflections because the wheel key extends axially outwardly beyond the flange of the wheel. As a result, radially inwardly wheel key movements impart highly concentrated loads from the wheel to the lower strength carbon rotors. Damage to carbon rotors or drive system components can result in decreased brake life and higher cost per brake landing costs. Additionally, as illustrated in FIGS. 2 and 3, the wear of the rotors 70 and stators 80 can result in rivets 60 touching the rivets of an adjacent rotor. The touching of the rivets can result in damage to components of the drive system and result in premature brake system component replacement.

Figure 5:
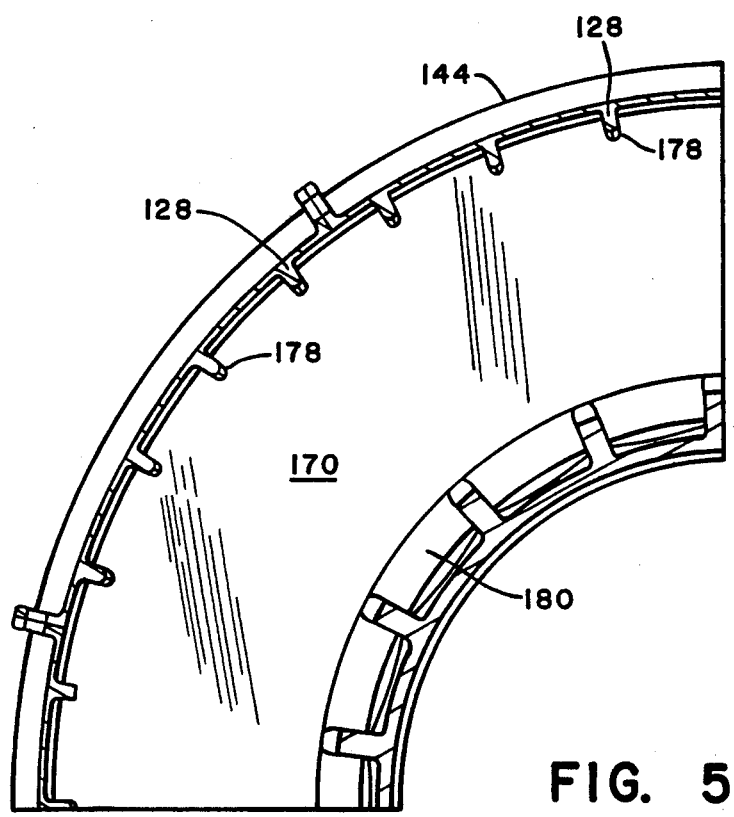
FIG. 5 is a section view taken along view line 5—5 of FIG. 4.
Figure 4:
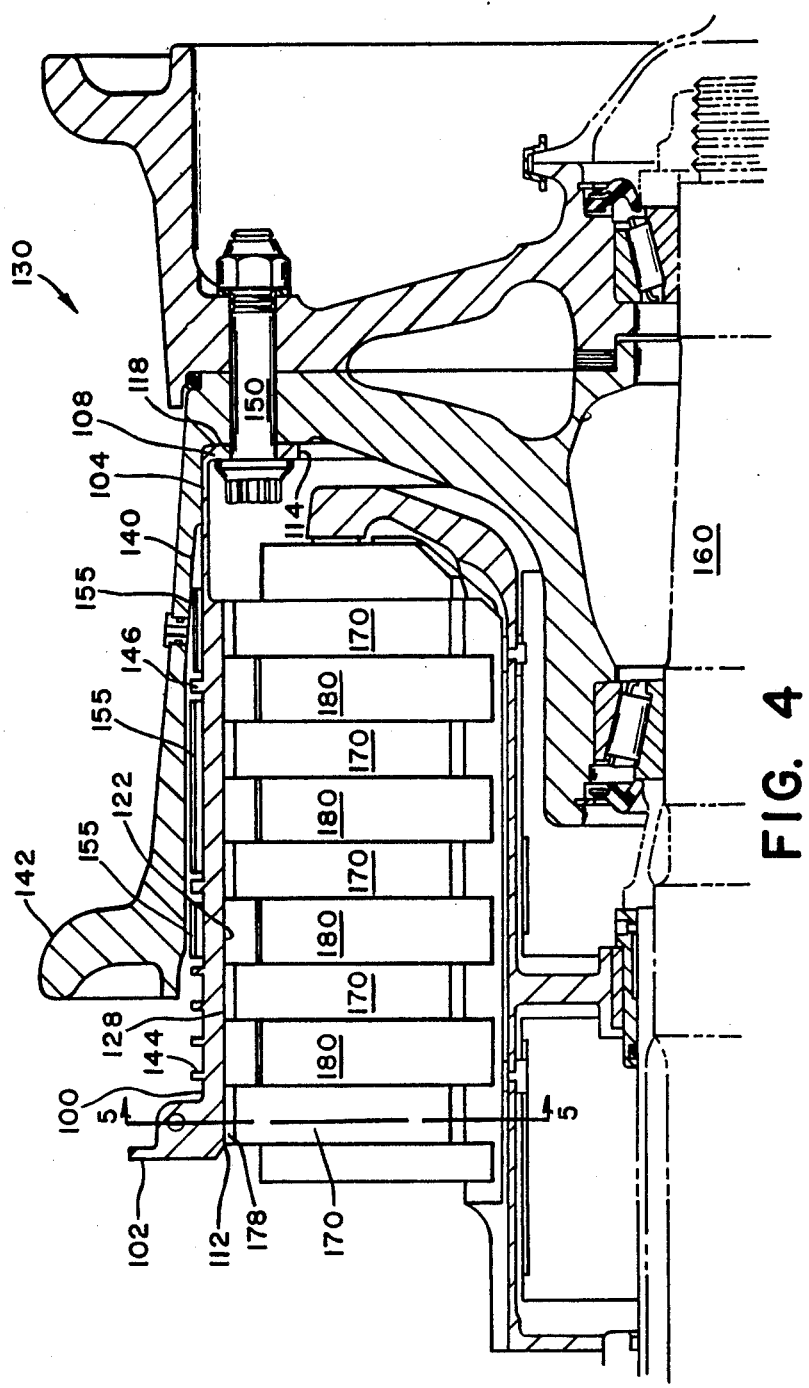
FIG. 4 is a section view of the drum drive of the present invention attached to a wheel and engaging rotors of a multiple disc brake.

The present invention eliminates the above problems by providing a drum drive 100 illustrated in FIG. 4. Drum drive 100 is received within the inboard half 140 of the wheel indicated generally by reference numeral 130. Wheel half 140 extends from the region about the tie bolt 150 to an inboard flange 142. The wheel is mounted by suitable bearing means on an axle 160. Drive 100 may comprise a plurality of drum parts which are connected together by fastening means or welding, in order to provide the annular-shaped drum. Alternatively, drum drive 100 may comprise a single integral part (see FIG. 8). Drum drive 100 of FIG. 4 extends axially between inboard end 102 to outboard end 104. Drum drive 100 is generally an annular-shaped drum such that end 102 defines an inboard or end opening 112 and end 104 includes a radially inwardly extending flange 108 which defines an outboard or end opening 114. Radially extending flange 108 includes a plurality of openings 118 for fastening means or tie bolts 150 which attach drum drive 100 to wheel 140. Drum drive 100 defines an interior axially extending opening 122 into which extends a plurality of circumferentially spaced apart, axially extending splines or drive means 128. The axially extending splines 128 extend radially inwardly into interior opening 122 and are received in complementary-shaped openings 178 in order to couple rotatably rotors 170 with drum drive 100, as can be seen more clearly in FIG. 5. Splines 128 are shown in FIG. 5 as being small in cross-section, however, it should be understood that splines 128 can have a wider circumferential width (see FIG. 7) and be received in complementary-shaped openings within a rotor. Drum drive 100 may comprise a plurality of radially outwardly extending heat flanges or vanes 144 which are disposed adjacent the inboard opening of wheel half 140, and also may include structural vanes 146.

Disposed about drum drive 100 and located inwardly of the interior surface of wheel half 140, are heat shields 155. Heat shields 155 prevent heat from being dissipated to adjacent wheel half 140 and the tire disposed thereabout. Drive 100 may be provided without heat vanes 144 and structural vanes 146 so that heat shield 155 may comprise a single heat shield (see FIG. 6) which extends axially about the exterior of the drum drive.

Drum drive 100 is disposed radially inwardly of end flange 142 of wheel half 140. The drum drive has substantially no connection along its axial length with wheel half 140. Thus, there is prevented the direct transmission of thermal energy generated bY rotors 170 and stators 180 to the wheel half 140. This prevents further transmission of heat by wheel half 140 to the tire disposed thereabout. Additionally, because drum drive 100 has no direct connection with substantially all of the axial length of wheel half 140, when wheel half 140 is deflected radially inwardly the wheel half deflects into the clearance located between the exterior of drive 100 and the interior surface of wheel half 140. Deflections caused bY the ovalization of wheel half 140 tend not to cause deflections of drum drive 100, and thus do not cause damage to the rotor drive system. Drum drive 100 is attached to wheel 130 at the tie bolt region. Because the drum is fastened at the structurally stronger or stiffer tie bolt region of the wheel, and is independent of the wheel flange area, the drum drive system eliminates the transfer of radial loading, caused by wheel deflection, into the carbon rotors. Drum drive 100 will maintain a circular configuration throughout the entire wheel revolution. The drum drive will also maintain a more uniform drive load distribution that is not characteristic of wheel key/insert systems. Drum drive 100 is designed so that it is independent of the wheel flange area in order to reduce the possibility for rotor disengagement caused by a wheel ovalization. Disengagement, which is common in wheel key/insert systems, creates higher, non-uniform loads on the remaining engaged keys which can cause rotor insert, rivet, and carbon bearing surface failures.

Figure 6:
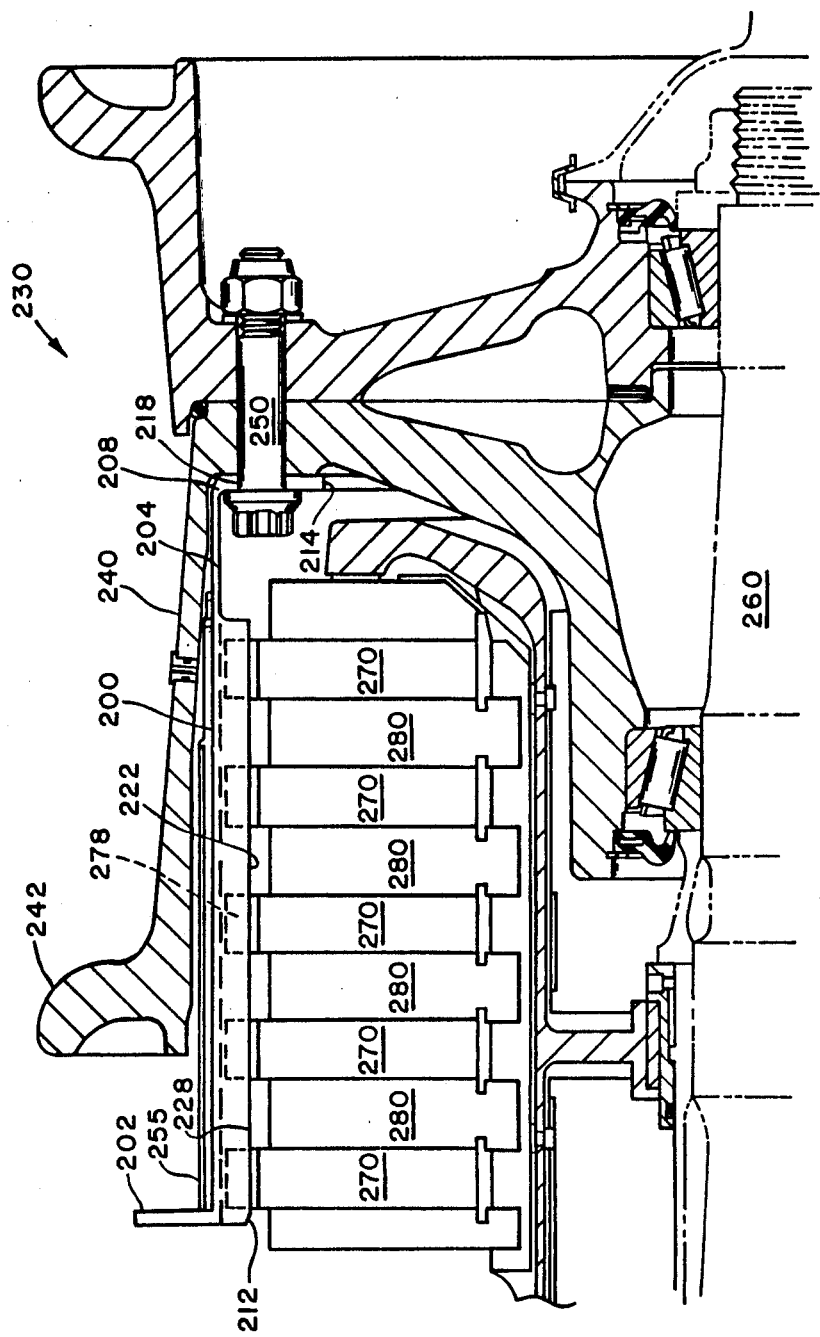
FIG. 6 is an alternative embodiment of the drum drive of the present invention.
Figure 7:
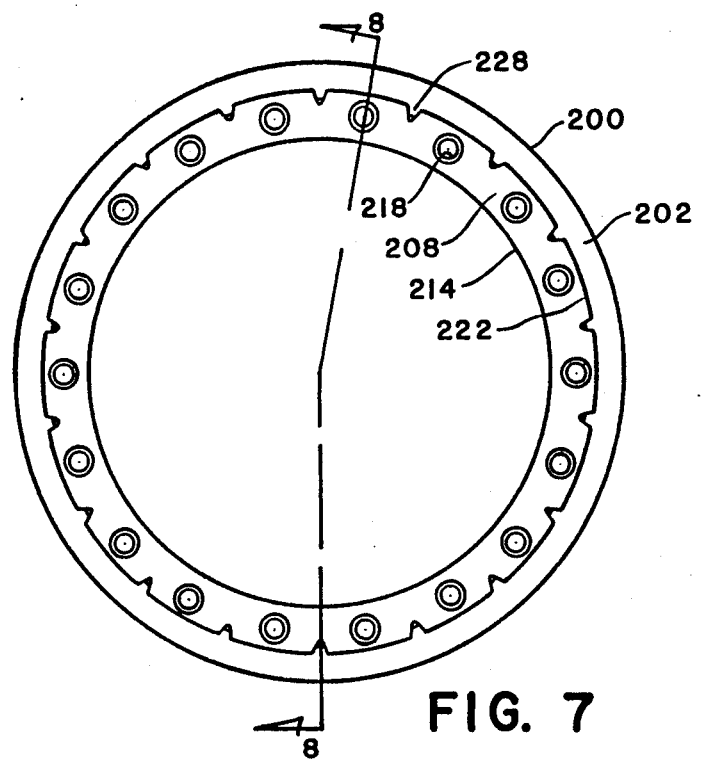
FIG. 7 is a side view of the drum drive of FIG. 6.
Figure 8:
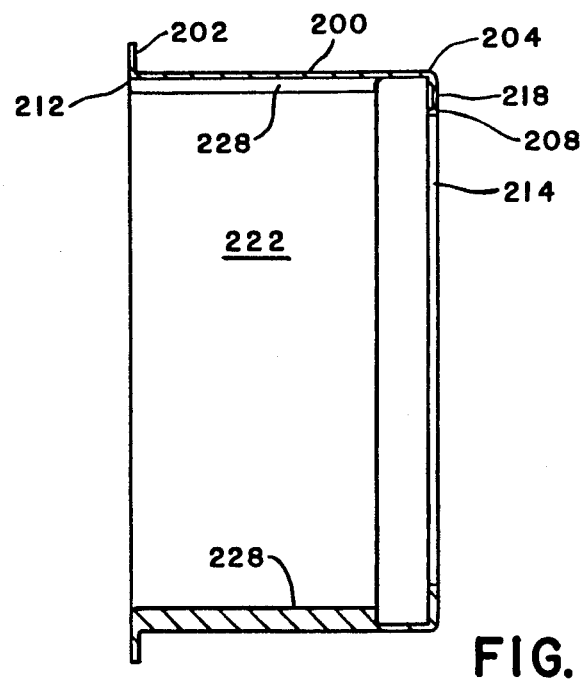
FIG. 8 is a section view taken along view lines 8—8 of FIG. 7.

FIGS. 6–8 illustrate an alternative embodiment of the drum drive. Similar structure is indicated by the same reference numeral increased by 100. Drive 200 is located within wheel 230 and attached by bolts 250. The splines 228 extend radiallY into interior axially extending opening 222 in order to couple rotatably rotors 270 with the drum drive and wheel. Splines 228 are wider than splines 128, as are openings 278. Drum drive 200 is a single, integral structure which has thereabout a single, axially extending heat shield 255. Shield 255 extends axially inboard past the inboard flange 242 so that the inboard wheel bead seat region is more effectively shielded from heat generated by the disc stack.

Figure 9:
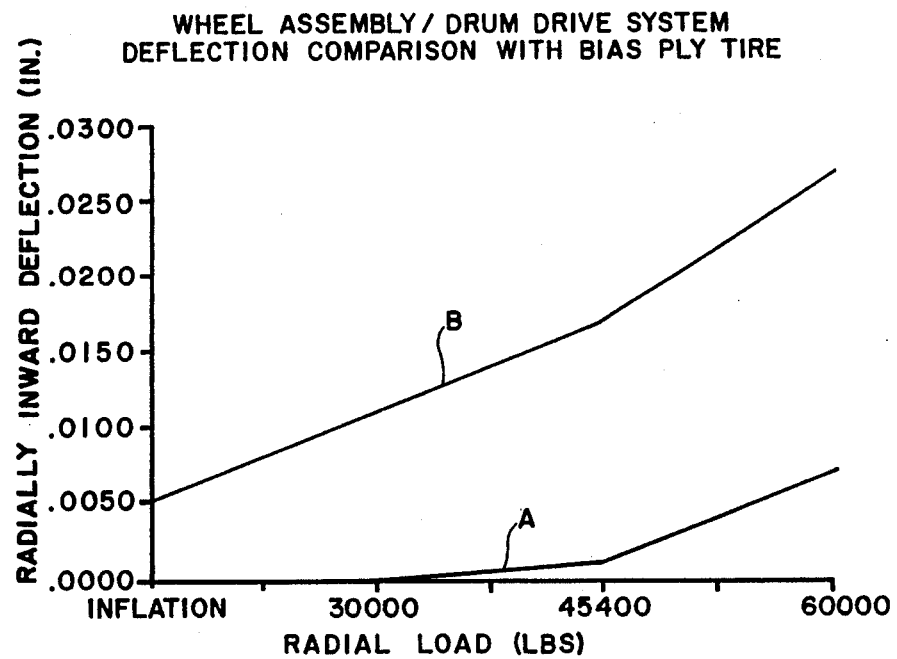
FIG. 9 is a graph of the drum drive system deflection with a bias-ply tire.
Figure 10:
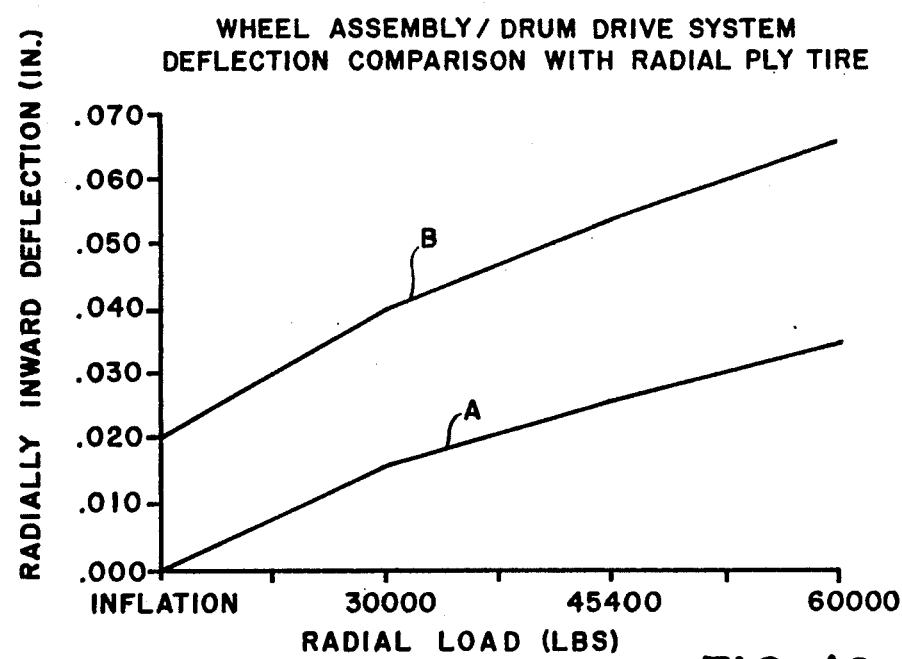
FIG. 10 is a graph illustrating the drum drive system deflection with a radial ply tire.

The drum drive of the Present invention accomplishes the important objectives which provide for a substantially improved rotor drive system. First, the drum drive provides an increased brake life potential as a result of the "rivets touching" problem being eliminated because the rotors no longer need inserts and rivets thereabout. The elimination of rotor inserts and rivets allows the brake discs to wear further without rivet contact. Without inserts and rivets, there is eliminated potential interference due to unsymmetrical carbon rotor wear. Second, the drum drive of the present invention may be a one-piece design. Whether the drum drive is made of several pieces which are coupled together or comprises a single integral drum, the drum is readily inserted within the inboard wheel half. Prior wheel key/insert systems would require as many as 270 pieces of hardware for one brake assembly. The present invention will significantly reduce assembly cost and time, which translates to substantial labor cost savings. In addition, the elimination of rivet holes in rotors and bolt holes near the wheel flange also increases the overall strength of the rotors and wheels and reduces machining costs. The drum drive of the present invention exhibits greater torsional strength than prior drive systems. High energy rejected take-off (RTO) stop tests indicate the greater torsional strength for the drum drive, and post-test analysis showed no drum damage occurred, while wheel key deformation and rotor insert melting was significant in that type of system. The drum drive provides a more efficient utilization of wheel heat sink capability. The conduction path of heat to the inboard wheel bead seat region greatly decreases with the drum drive because of the elimination of a direct path between the wheel flange, tire bead, and hot friction components by means of the key bolts illustrated in FIG. 1. The drum drive of the present invention provides a direct conductive heat path to the outboard wheel half. A reduction of inboard wheel flange and bead seat region temperatures (which minimizes the potential for tire fires) and a reduction in wheel hub temperatures could be realized using the present invention with appropriate heat shielding. The present invention can prohibit tire fires in many aircraft specifications such as a 100% dry rejected take-off. No resultant tire fire followed a 49.6 mft-pound brake kinetic energy test. Structural analysis performed to evaluate the effective wheel deflection on the drum drive of the present invention included dynamic and static tests with both bias-ply and radial-ply tires. The tests results indicate that at the most severe conditions, radially inward drum deflections (curves A) were only 10 to 30 and 53 to 58% of wheel deflection (curves B) for bias-ply and radial-plY tires, respectively (see FIGS. 9 and 10). Testing indicated no significant increase in temperature throughout the wheel and brake structure. Further temperature reductions can be expected with improved heat shielding designs. The drum drive also can maintain its structural integrity following high brake kinetic energy RTO stops. At the conclusion of the RTO test, it was observed that no structural damage occurred to the drum splines or barrel configuration of the drum. Typically, the wheel keys of prior designs are often deformed following similar RTO tests. There is no difficulty in disassembling the drum drive system from the brake. Conversely, wheel key/insert system disassembly from the brake requires considerable effort due to deformed keys and molten inserts.

The elimination of rotor inserts can provide a simplification of the brake disc refurbishment program. Prior Procedures require the disassembly of inserts from used rotors before refurbishment, and rivet hole rework and reassembly of inserts after refurbishment. Considerable cost and time savings would be realized utilizing the drum drive with carbon rotor discs in a disc refurbishment program.

We claim:

1. A drum drive of a disc brake for a single wheel and having a plurality of interleaved nonrotatable stator discs and rotatable rotor discs wherein the rotor discs are connected with the single wheel, the drum drive comprising an annular drum having an axial length which extends axially from an inboard end to an outboard end, the inboard end having an end opening and the outboard end having an end opening, an interior axially extending opening between the end openings, the drum including at spaced positions thereabout a plurality of axially extended splines which extend radially inwardly into the interior axially extending opening, the outboard end of the drum including a radially inwardly extending flange with an interior edge defining the end opening at the outboard end, the flange having a plurality of opening means receiving wheel fastening means thereat, the axially extending splines engaging complementary-shaped openings in said rotor discs in order to connect said rotor discs with said wheel, the inboard end of the drum having a radially outwardly extending opposite flange, and the axial length of the drum disposed substantially within the wheel such that a substantial portion of an exterior surface of the drum is spaced substantially radially apart from an interior surface of the wheel, so that radial spacing between the surfaces minimizes radial loading upon said discs caused by wheel deflection, the single wheel comprising two wheel parts held together by the wheel fastening means, and continuous annular heat shield means disposed exteriorly of the drum and extending axially within said wheel, the shield means extending axially at one end to abut the opposite flange and at the other end supported by the drum.

2. The drum drive in accordance with claim 1, wherein the drum comprises a plurality of drum segments which are attached together to form said annular drum.

3. The drum drive in accordance with claim 1, wherein said fastening means comprises tie bolts which attach said drum to the wheel and couple together the wheel parts.

4. The drum drive in accordance with claim 1, wherein the wheel comprises an aircraft wheel and the discs are carbon discs.

5. A drum drive for a single wheel and which includes a multiple disc brake, the drum drive having an axial length extending axially within an axial opening of said wheel such that the axial length is disposed substantially within the axial opening, the drum drive further comprising a substantially annular drum having end openings at opposite axial ends thereof communicating with an axially extending interior opening, one end opening defined by an attachment part which includes a plurality of means for attachment which receive connection means connecting the drum with the wheel, the other axial end of the drum having a radially outwardly extending flange, a plurality of circumferentially spaced-apart, axially extending drive means extending radially inwardly into the interior opening of said drum, and the drive means engaging associated reception means of associated discs in order to couple the associated discs with the drum and wheel, a substantial portion of the axial length of the drum spaced substantially radially inwardly from the wheel so that radial spacing between the drum and wheel minimizes wheel deflection radial loading upon discs of said brake, the single wheel comprising two wheel parts held together by the connection means, and continuous annular heat shield means disposed exteriorly of the drum and extending axially within said wheel, the shield means extending axially at one end to abut the flange and at the other end supported by the drum.

6. The drum drive in accordance with claim 5, wherein the drum comprises a single integral member connected with said wheel.

7. The drum drive in accordance with claim 5, wherein the drum comprises a plurality of drum segments which are attached together to form said annular drum.

8. The drum drive in accordance with claim 5, wherein the reception means of the associated discs comprises disc openings shaped complementary with said drive means.

9. The drum drive in accordance with claim 5, wherein the wheel comprises an aircraft wheel and the discs are carbon discs.

* * * * *